Feb. 2, 1943.    J. J GOUGH    2,309,640
ELECTRIC TOASTER
Filed June 3, 1940    3 Sheets-Sheet 1
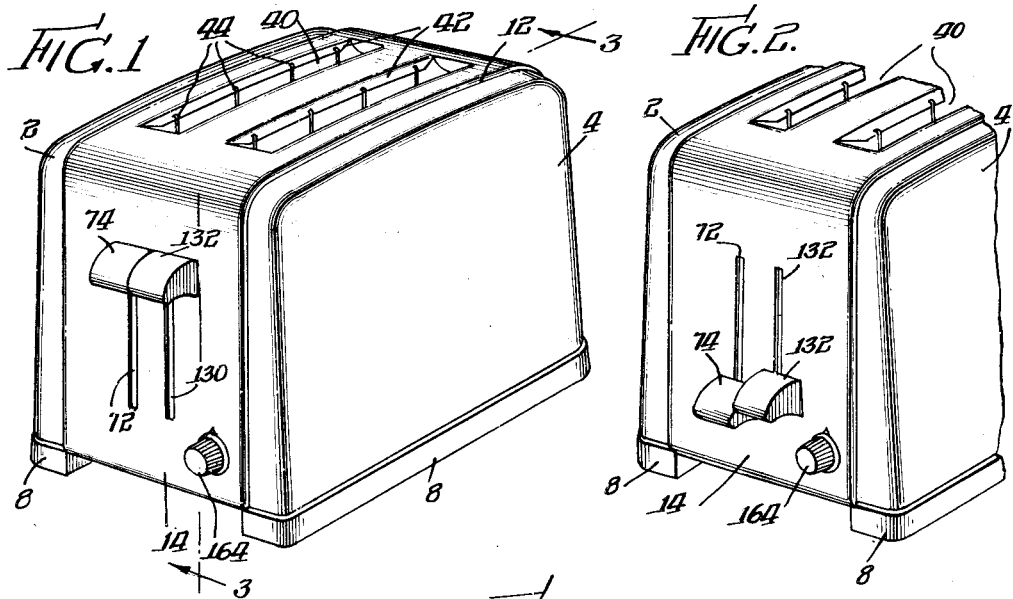
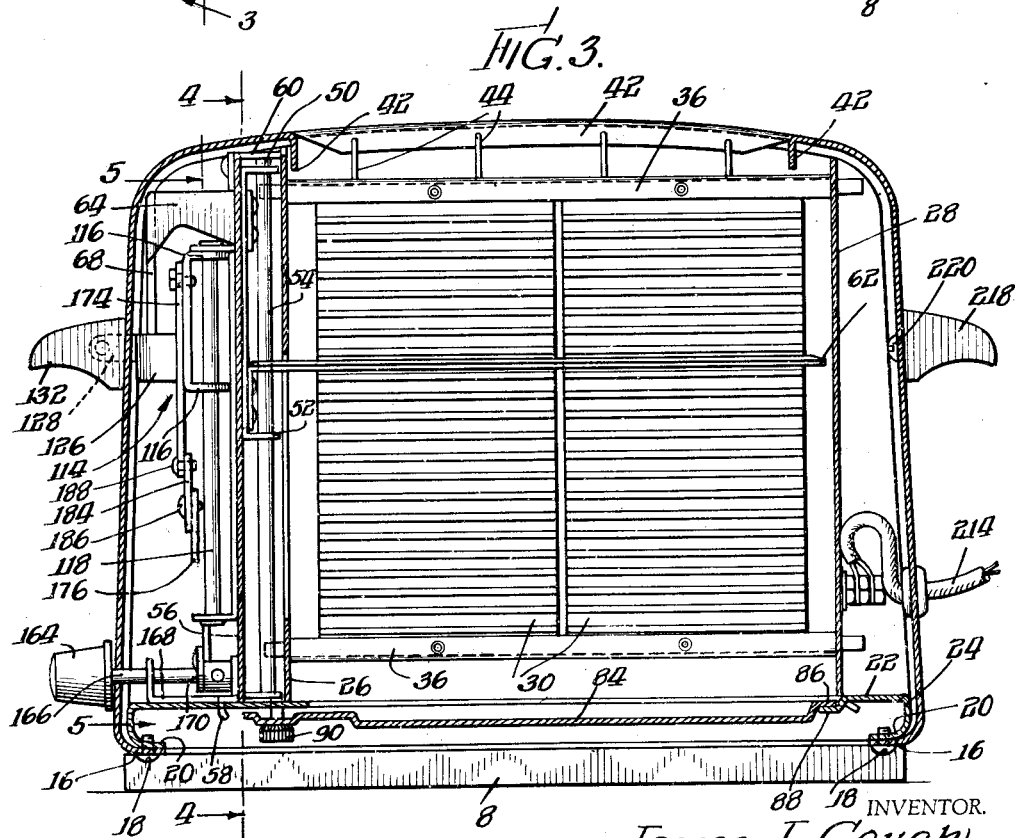
INVENTOR.
James J. Gough
BY Cox & Moore
ATTORNEYS.

Feb. 2, 1943.   J. J GOUGH   2,309,640
ELECTRIC TOASTER
Filed June 3, 1940   3 Sheets-Sheet 2
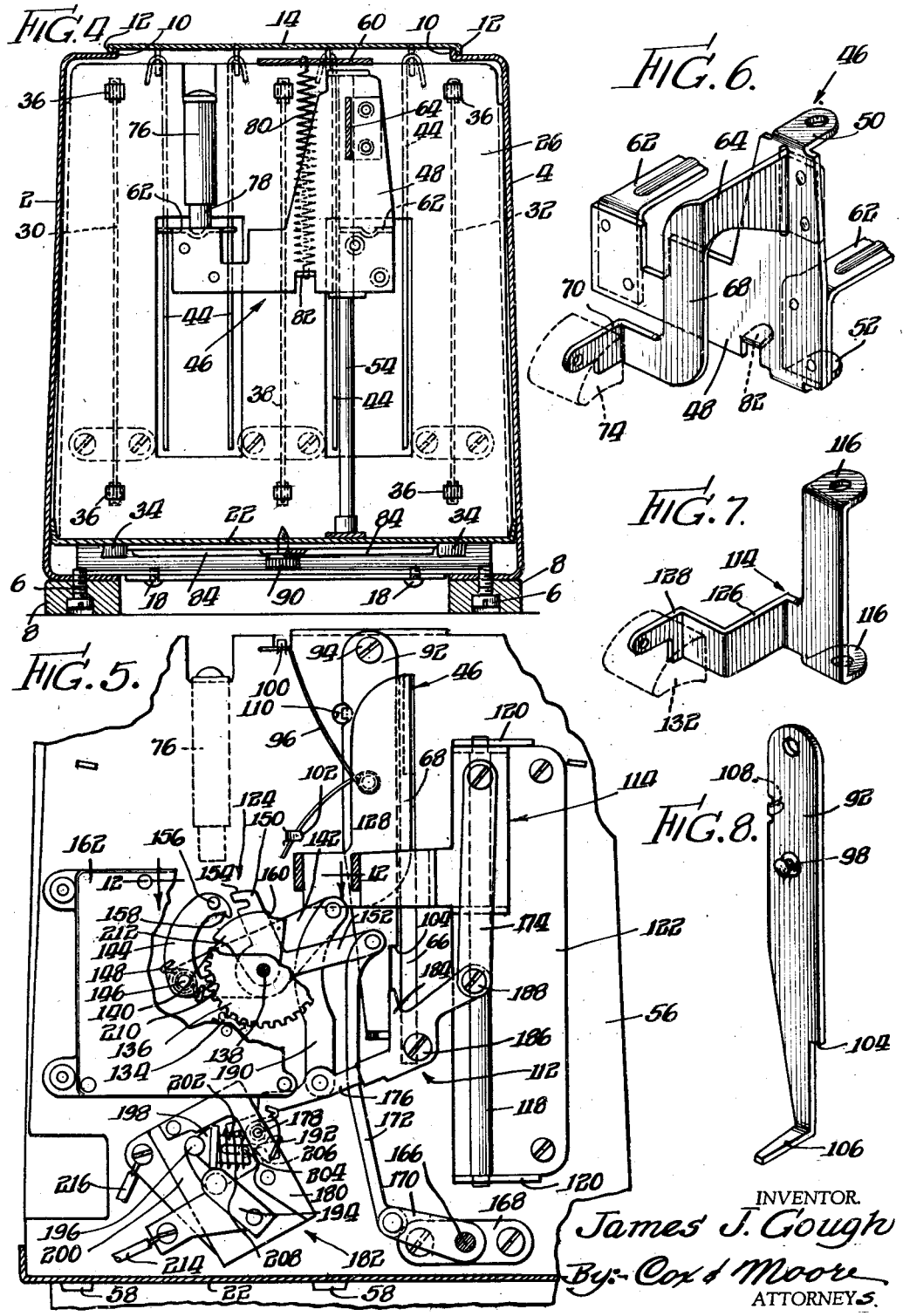
INVENTOR.
James J. Gough
By:- Cox & Moore
ATTORNEYS.

Feb. 2, 1943.  J. J GOUGH  2,309,640
ELECTRIC TOASTER
Filed June 3, 1940  3 Sheets-Sheet 3
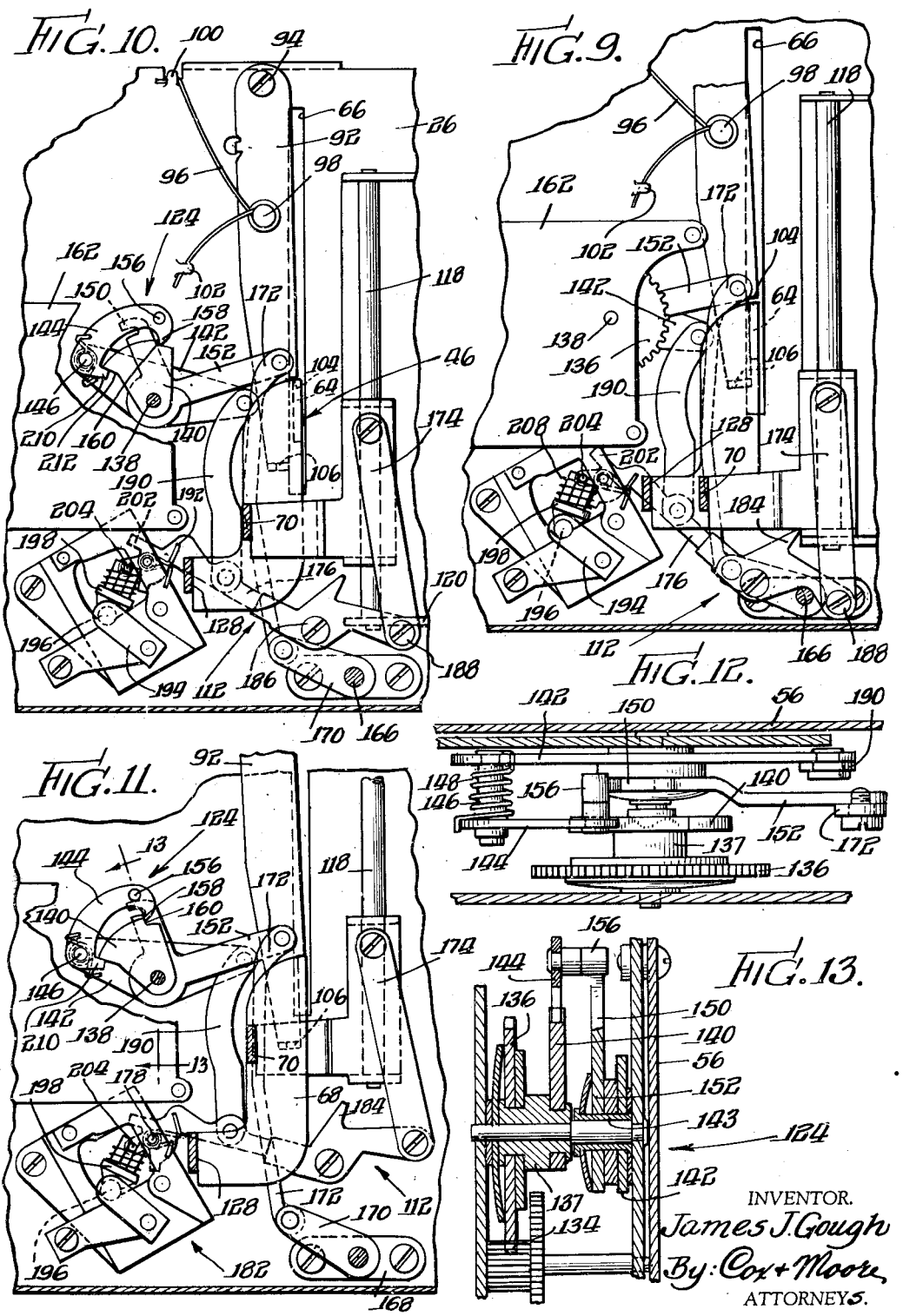
INVENTOR.
James J. Gough
By: Cox + Moore
ATTORNEYS.

Patented Feb. 2, 1943

2,309,640

UNITED STATES PATENT OFFICE 2,309,640

ELECTRIC TOASTER

James J. Gough, Chicago, Ill., assignor to Chicago Electric Manufacturing Company, Chicago, Ill., a corporation of Illinois Application June 3, 1940, Serial No. 338,449

7 Claims. (Cl. 161—16)

This invention relates to electric toasters and has more particular reference to electric toasters of the type having a bread receiving tray or trays vertically shiftable to carry the bread between the toasting elements.

An object of the invention is to improve the construction and decrease the manufacturing cost of toasters of this type.

Another object of the invention is to provide in a toaster of this type a timing control and to provide independent but simultaneously actuatable members to set the timing control and shift the article receiving tray or trays into toasting position.

A further object of the invention is to provide in a clock controlled toaster of this type independent, manually operable members which may be simultaneously actuated to move the article receiving tray or trays into toasting position and to set the clock control and wherein the manually operable member for setting the clock control is itself controlled by the clock to effect an instantaneous release of the other manually operable member after the lapse of the predetermined adjustable period of time whereby the article receiving tray or trays is released by snap action for movement to non-toasting position.

The invention has for another object the provision of a clock control and release mechanism mounted in an end chamber formed by the walls defining the external casing and the toaster chamber whereby the structure may be simple and its manufacturing cost materially reduced as compared with similar toasters heretofore known.

A further object of the applicant's invention is to provide in a toaster of this type a casing construction formed of sheet metal stampings which may be readily assembled and interlocked at a minimum manufacturing expense.

A still further object of the invention is to provide a casing construction for a toaster of this type wherein means is provided for creating an updraft of air through the toasting chamber or chambers for insuring uniform toasting of each article and for minimizing the differences in the degree of toasting of successively toasted articles.

The applicant's invention also contemplates the provision of readily releasable crumb receiving means underlying the tray or forming the bottom wall of the toaster chamber or chambers and being spaced when in operative position from its mounting wall so as to provide ventilating openings insuring maintenance of the tray in a relatively cool condition and facilitating an updraft of air through the toasting chamber.

Other and further objects and advantages will be apparent from the following description when taken in connection with the accompanying drawings, wherein Fig. 1 is a perspective view of a toaster embodying the invention;

Fig. 2 is a fragmentary perspective view similar to Fig. 1 but showing the controls in the different operating positions;

Fig. 3 is an enlarged vertical section taken along the line 3—3 of Fig. 1;

Fig. 4 is a vertical section taken along the line 4—4 of Fig. 3;

Fig. 5 is a fragmentary enlarged vertical section taken along the line 5—5 of Fig. 3;

Fig. 6 is a fragmentary perspective view of the toast carriage and operating arm;

Fig. 7 is a perspective view of the control member of carriage;

Fig. 8 is a perspective view of the latch for the toast carriage;

Figs. 9, 10 and 11 are fragmentary vertical sections similar to Fig. 5, but with the parts in different positions of operation;

Fig. 12 is a fragmentary enlarged horizontal section taken substantially along the line 12—12 of Fig. 5; and Fig. 13 is a fragmentary enlarged vertical section taken along the line 13—13 of Fig. 11.

As shown in Figs. 1-4 of the drawings, the embodiment selected to illustrate the invention comprises a pair of pan-shaped, sheet metal stampings forming opposed side members 2 and 4. These side members are fastened in any convenient manner as by screws 6 passing through the bottom flanges of the members and received in spaced mounting bars 8 of any suitable heat insulating material whereby the toaster casing is spaced vertically from the surface or table on which it is used. The relatively large space thus provided between these mounting bars 8 permits a substantial circulation of air beneath the casing, to thus prevent overheating of the surface or table upon which the toaster is used. The upper inturned flange of each of the side members is formed to provide an upstanding flange or bead 10 interlocking with the downturned peripheral flanges 12 of a central substantially U-shaped sheet metal stamping or casing member 14. The interlocking of the flanges 10 and 12 secures the casing members 2, 4 and 14 against outward lateral displacement.

At its lower ends, the central casing member 14 is turned inwardly to provide flanges 16 fastened as by screws 18 to the inturned flanges 20 of a sheet metal plate 22 forming the bottom for the toasting or heating chamber. The bottom plate 22 is preferably formed with a vertical peripheral flange 24 integrally connecting the upper plate portion with the inturned flanges 20 so as to reinforce the bottom plate and to engage and hold the casing members 2, 4 and 14 against inward displacement.

The toasting or heating chamber is formed by the plate 22 in cooperation with the end plates 26 and 28 and the outer sheet-like heating elements 30 and 32 which form the side walls of the heating chamber. The end plates 26 and 28 may be secured to bottom plate 22 in any convenient manner as for example by depending lugs 34 extending through openings in the bottom plate and twisted for retention therein. The heating elements 30 and 32 may be of conventional structure and preferably of sheet-like formation secured between hanger bars or clips 36 having reduced ends received in suitable apertures in the end plates 26 and 28. The heating chamber is preferably subdivided by a sheet-like heating element 38 disposed centrally of the chamber and mounted on the end plates 26 and 28 in a manner similar to the outer heating elements 30 and 32.

The top of the toaster as formed by the central casing member 14 is provided with openings 40 into the toast chamber or chambers. The edges of the openings 40 are defined by depending flanges 42, the longitudinally extending ones of which provide mounting means for the usual guard wires 44 which extend over the heating elements and prevent the toast from engaging such elements. At their lower ends the guard wires 44 may be secured to any suitable transverse mounting strip not shown.

A toaster carriage or tray 46 comprises a sheet metal plate 48 (Figs. 4 and 6) having perpendicular, perforated aligned lugs 50 and 52 slidably mounting the toast carriage on a rod 54 (Figs. 3 and 4) extending vertically of the toaster casing and located between the partition 26 and a vertical partition 56. The partition 26 extends between the side walls 2 and 4 of the toaster casing and between the bottom plate 22 and the top wall of the casing. At its lower end the partition 26 may be secured to the bottom plate 22 as by forwardly and downwardly projecting lugs 58 passing through the bottom plate and twisted to hold the partition in place. At its top edge the partition 56 is formed with an inwardly turned portion 60 fastened to the partition 26 in any suitable manner.

The toast carriage 46 carries toast receiving shelves or trays 62 passing through a suitable opening or openings in the partition 26 and into the toasting chambers. At their outer ends the shelf members or bars 62 are bent downwardly and spot-welded or otherwise fastened to the plate 48. An operating arm of sheet metal has a portion 64 which passes through a slot in the plate 48 and has its bent-over end spot-welded or otherwise fastened to the inner surface of this plate. The arm portion 64 extends outwardly from the plate 48 at right angles thereto and passes through a slot 66 in the partition plate 56.

The operating arm includes a portion 68 extending downwardly from the arm portion 64 substantially parallel to the outer wall of the toaster casing and an outwardly bent portion 70 extending out of the toaster casing through a slot 72 in one end wall of the casing. An operating knob or handle 74 is secured to the outer end of the portion 70 of the operating arm.

A dash pot 76 of suitable construction in which a spring or the like resists an upward movement of a plunger 78 is mounted on the partition 26, or the partition plate 56, in position where its plunger 78 is engaged by a portion of the carriage 46, as for example, one of the shelves 62 as shown in Fig. 4, as the carriage approaches its upper limit of movement to project the toast out of the openings 40 in the casing. The toast carriage is returned to this upper non-toasting position by a coil spring 80 having its upper end secured to the plate portion 60 of the partition 56 and its lower end secured to an inwardly bent lug 82 struck from the lower edge of the plate 48 of the toast carriage 46.

The bottom part of the toast chamber or chambers is partially closed by a detachable, generally pan-shaped tray 84, Figs. 3 and 4, having a rear flange portion 86 off-set upwardly from the bottom of the pan and resting upon a downwardly off-set flange or lug 88 of the bottom plate 22. A cap screw 90 secures the opposite side of the pan 84 to the bottom plate 22 and is preferably so formed that the pan cannot be pulled up tightly against the bottom plate, but an opening is maintained between the pan and the bottom plate, which opening preferably extends around three sides at least of the pan so that a relatively large amount of air may pass between the pan and the bottom plate and upwardly through the toasting chambers. Thus the pan is maintained relatively cool and the heat within the toasting chambers is relatively rapidly dissipated between toasting operations.

This insures a relatively high degree of uniformity in the toasting of successive slices. The pan or tray 84 of course provides readily detachable crumb-receiving means underlying the toast chamber so that the crumbs from the toast will not collect, as formerly, upon parts of the toaster to which access cannot readily be had for cleaning purposes, but will collect upon the detachable pan which may be readily removed and cleaned.

Latching means are provided for retaining the toast carriage in its lower, toasting position. This latching means comprises a latch bar, plate or lever 92 pivotally secured to the outer surface of the partition 56 as by a screw or pin 94. A spring 96 having an intermediate portion coiled about a pin 98 carried by the latch lever and its opposite ends secured by lugs 100 and 102 to the partition plate 56 normally urges the latch lever in a counterclockwise direction as seen in Figs. 5, 9, 10 and 11 and into the path of the portion 64 of the toast carriage operating arm.

The latch lever is provided with a shoulder 104 for engaging the portion 64 of this toast carriage operating arm to hold the toast carriage in its lower toasting position. The latch lever is also provided with an outwardly extending free end portion or lug 106 adapted to be engaged by a mechanism for releasing the latch from the toast carriage to permit the carriage to move under the action of the spring to its upper, non-toasting position. Swinging of the latch lever 92 is limited by a lug 108 formed on the latch lever and received in an opening 110 in the partition plate 56.

The latch lever 92 is released and normally retained in an inactive position by a latch releasing mechanism 112 which comprises a sheet metal carriage 114 (Fig. 7) slidably mounted, as by the perforated ears or lugs 116, on a guide rod 118.

The guide rod 118 extends vertically in the space between one end wall of the toaster casing and the partition plate 56 as shown in Fig. 3. This rod is mounted on the outwardly turned ears 120 of a generally U-shaped bracket 122 (Fig. 5) of sheet metal fastened to the partition plate 56. The carriage 114, which forms a means for setting the latch releasing mechanism 112 and the clock controlled mechanism 124, has an outwardly-turned arm 126 formed integrally with a portion 128 which extends out of the toaster casing through a slot 130. The extending end 128 has secured thereto an operating knob or handle 132, which, when the carriage 114 and the carriage 46 are at their upper limits of movement, lies in a common plane with the operating knob 74 for the toast carriage 46 as shown in Fig. 1. The guide rods 54 and 118 are parallel as also are the slots 72 and 130. Hence the knobs 74 and 132 may be operated simultaneously by the fingers of the same hand to place the carriage 46 in toasting position and the carriage 114 in a position setting the clock controlled mechanism 124 and the latch releasing mechanism 112 controlled by the clock controlled mechanism.

The clock or timing mechanism may be of any suitable or conventional structure providing a gear 134 and providing the operating gear 136 of the time controlled mechanism 124. The gear 136 is secured to the sleeve 137 (Figs. 12 and 13) loosely journaled on the shaft 138. The sleeve 137 is also secured to the latch keeper 140. A lever 142 (Figs. 5, 12 and 13) is carried by a bushing 143 journaled on the shaft 138 and at one end carries a latch 144 which is pivoted thereto as by a pin 146. The latch 144 is normally urged in a clockwise direction relative to the lever 142 by a spring 148 coiled about the pin 146 and secured at its opposite ends to the lever 142 and latch 144. A cam 150 for releasing the latch 144 from the keeper 140 is formed integrally with a lever 152, also loosely journaled on the shaft 138. The cam face 154 of the cam 150 is formed as a surface of constantly increasing radius from the axis of the shaft 138 in the direction of counterclockwise rotation of the gear 136, the keeper 140, and the latch lever 144.

The latch 144 carries at its outer end a pin 156 adapted to extend over and engage the cam face 154 of the cam 150 and is also provided with a latching nose 158 engageable with the radial shoulder 160 of the keeper 140.

The clock or timing mechanism and the clock controlled mechanism 124 may be mounted in any suitable and convenient housing 162 fastened to the partition plate 56 and disposed between this plate and the adjacent outer end wall of the toaster casing.

The cam 150 is adjustable to determine the length of the toasting interval by means of an operating knob 164 (Figs. 1 and 3) secured to the outer end of a rod 166 journaled in a bracket 168 secured to the partition plate 56 and/or the bottom plate 22 in the space between the partition 56 and the adjacent end wall of the toaster casing. The rod 166 carries a lever or crank 170 to which is pivoted a link 172 that is in turn pivoted at its other end to the cam lever 152.

The clock controlled mechanism 124 is connected to the carriage 114 through a linkage comprising a lever 174 pivoted at one end to the carriage as shown in Figs. 5 and 9 to 11. The lever 174 is pivoted at its opposite end to a lever 176 pivoted as at 178 adjacent its opposite end to the frame 180 of a switch mechanism 182. The lever 176 is fabricated to provide a latch operating finger 184 adapted to engage the finger 106 of the main latch bar or lever 92. The latch finger may be made integrally with the lever 176 or may be formed in a separate piece recessed in its inner face to receive one end of the lever and fastened thereto as by the screw 186, the latch finger piece also forming the pivotal connection between the lever 176 and the lever 174 as at the point 188. The link 190 joins the lever 176 and the lever 142.

A spring 192 having its mid portion coiled about the pivot pin 178 is secured at one end to the frame 180 of the switch mechanism 182 and at its other end to the lever 176. This spring urges the lever 176 in a counterclockwise direction about the pin 178 as seen in Fig. 5 and urges the latch finger 184 and the carriage 114 to their upper position as shown in said figure. This spring also urges the latch 144 in a counterclockwise direction to the position shown in Fig. 5.

The switch mechanism 182 may be of any suitable conventional structure, but preferably comprises a pair of contacts 194 spaced upon the frame in a direction perpendicular to the plane of the drawings to receive therebetween similarly spaced electrically connected rollers 196 carried by a member 198. The member 198 moves from the position shown in Fig. 5 to the position shown in Figs. 9 to 11 along the surface of the insulating and roller guiding piece 200. The member 198 has a bifurcated portion 202 receiving between the furcations a pin 204 carried on the lug 206 formed on the lever 176. A spring 208 encircles the bifurcated portion 202 of the member 198 and presses against this member and against the pin 204. As the lever 176 is moved in a clockwise direction as seen in Fig. 5, the pin 204 causes a compression of the spring 208 until the line of the pin 204 and rollers 196 passes from one side of the pin 178 to the other and the member 198 then snaps from the position shown in Fig. 5 to that shown in Figs. 9 to 11 to cause the rollers to snap into engagement with the contacts 194. As the lever 176 swings in the opposite or counterclockwise direction under the control of the time controlled mechanism 124, the switch member 198 similarly snaps from engagement with the contacts 194 as shown in Figs. 9 to 11 into the circuit breaking position as shown in Fig. 5.

As the carriage 114 is moved downwardly to operate the switch mechanism 182 to set the timing mechanism, the lever 142 is moved in a clockwise direction to cause the latch 144 to move over the cam 150 and to engage with the shoulder 160 of its keeper 140 and the tail piece or lug 210 formed on the latch 144 engages the rear radial edge 212 of the keeper 140 to move the keeper clockwise with the latch and set the timing mechanism.

Electric current for energizing the toast heating elements 30 is supplied to the toaster through the usual two-conductor cable or appliance cord 214 (Fig. 3) of which one conductor is connected directly to one end of one of the heating elements and the other conductor is connected to one of the switch contacts 194. The other switch contact 194 is connected as by the wire 216 to one end of another of the heating elements, the heating elements being connected in series between one conductor of the cable 214 and the wire 216.

A knob or handle 218 is secured to an end wall of the toaster casing as by the screw 220. The knob 218, in cooperation with the knob 74 and/or the knob 132, provides means for moving the toaster from place to place as desired.

Applicant's toaster may readily be assembled as follows: The sets of heating elements 30, 32 and 38 are secured to the partition plates 26 and 28 as by twisting the outwardly extending ends of the upper and lower hanger bars of these heating elements to hold the heating elements against lateral movement relative to these partition plates. The partition plates 26 and 28 may be secured to the bottom plate 22 as by twisting the depending lugs 34.

The toast carriage 46 is mounted on its guide rod 54 and the guide rod fastened in a suitable manner to its mounting lugs formed on the partition plate 56. The operating arm for the toast carriage is then positioned in its slot 66 of the partition 56 and spot-welded to the plate 48 of the toast carriage. The partition plate 56 is then secured to the bottom plate 22 and to the partition plate 26 as by twisting over lugs 58 formed on the plate 56 and which extend through openings in the bottom plate 22 and the partition plate 26. Before the plate 56 is positioned on the bottom plate, the bracket 122 for the carriage 114 is fastened to the outer surface of the plate 56 and the dash-pot 76 is secured to the inner surface of this plate. The timing mechanism in its housing 162, the time controlled mechanism 124, the switch mechanism 182 and the adjusting rod 166 are then mounted on the outer side of the partition plate 56 and the various links and levers connecting these mechanisms and also the latch lever 92 are properly connected and mounted on the plate 56.

The side forming plates 2 and 4 are first mounted on the mounting bars 8 as by the screws 6 and are then positioned to abut opposite edges of the partition plates 26, 28 and 56. The connections are effected between the switch mechanism, the supply cord, and the heating elements and the casing member 14 carrying the knob 218 is positioned so that its marginal flanges 12 overlie the marginal flanges 10 of the side pieces 2 and 4 and is fastened to the bottom plate as by the screws 18. The knobs 74 and 132 are secured to the projecting ends 70 and 128 of the carriages 46 and 114, and the knob 164 is secured to the outer end of the rod 166. The guard wires 44 may be secured to the central frame casing 14 either before or after its assembly with the other parts of the toaster casing. To complete the toaster, the crumb tray 84 is now positioned with its flange or lugs 86 overlying the flange or lugs 88 of the bottom plate 22 and fastened to the bottom plate in spaced relation by the screw 90.

The operation of applicant's toaster is as follows: The toast carriage 46 being in its upper, non-toasting position, in which position it is held by the spring 80, is moved downwardly by manipulation of the knob or handle 74. The knob or handle 132 is simultaneously manipulated with the knob 74, and by the fingers of the same hand, to move the carriage 114 to its lowermost position as shown in Fig. 9. The downward movement of the toast carriage 46 carries the portion 64 of its operating arm beneath the latching shoulder 104 of the latch lever 92 and under the action of its spring 96, the latch lever swings in a counter-clockwise direction so that the shoulder 104 overlies the arm portion 64 of the toast carriage as shown in Fig. 10 and holds the toast carriage in its lowered position.

The downward movement of the carriage 114 causes the lever 176 to swing in a clockwise direction as seen in Figs. 5 and 9 to 11 to the position shown in Fig. 9.

In moving to this position, the lever 176 causes the contact carrying member 198 to snap into engagement with the contacts 194 to complete the circuit for the heating elements of the toaster and this lever 176 also causes the lever 142 to move in a clockwise direction to the position shown in Fig. 10, in which the tail piece 210 of the latch 144 engages the edge 212 of the keeper 140 to set the timing mechanism. The toasting operation is now started.

The timing mechanism now causes the gear 136 and the keeper 140 to rotate in a counter-clockwise direction. Under the urge of the spring 192, the levers 176 and 142 also rotate in a counterclockwise direction and the nose 158 of the latch 144 is maintained in engagement with the shoulder 160 of the keeper 140. As the latch 144 moves in this counterclockwise direction with the keeper, the pin 156 engages and traverses the cam face 154 of the cam 150. This cam causes the latch 144 to swing in a counterclockwise direction relative to the lever 142 and to be released from the keeper 140 after the desired time interval has elapsed. Upon release of the latch 144 from the keeper 140, the spring 192 causes a rapid movement of the lever 176 which snaps the switch member 198 out of engagement with the contacts 194 and the latch finger 184 into engagement with the tongue 106 of a latch lever 92, thus breaking the electrical circuit to the toaster and snapping the latch lever 92 out of engagement with the operating arm portion 64 of the toast carriage so that the toast carriage moves quickly upward to project the toast out of the openings 40 of the toaster casing.

As the toast carriage 46 approaches its upper non-toasting position, its speed of upward movement is checked by the dash-pot 76 as will be evident herein.

It will be seen that during a toasting operation and as the latch releasing mechanism 124 under the control of the timing mechanism moves in a counterclockwise direction, the carriage 114 moves upwardly along its guide rod 118 at a slow rate determined by the speed of the timing mechanism. Fig. 11 illustrates the position of the mechanism at the instant preceding the release of the latch 144 from the keeper 140. It will be seen that the carriage 114 has moved upwardly a substantial distance relative to the toast carriage 46, but the latch finger 184 which is also moved upwardly with the carriage is still a substantial distance below the operating tongue 106 of the latch lever 92 so that when during the next instant the latch 144 is released from the keeper, the latch finger 184 may attain, before striking the tongue 106, a sufficient velocity to effect substantial instantaneous release of the latch lever 92 from the toast carriage.

With this construction, the knob 164 may be used not only to adjust or predetermine the toasting interval, but may also be used to release the toast carriage at any time during a toasting operation. Thus if it is desired during a toasting operation to release the toast carriage, the knob 164 is rotated to rotate the rod 166 in a counter-clockwise direction as seen in Figs. 5 and 9 to 11.

This effects a clockwise rotation of the cam 150 so that it engages the pin 156 of the latch 144 and releases this latch from the keeper 140. Release of the latch 144 and the keeper 140 now effects release of the latch 92 from the toast carriage 46 and an opening of the switch mechanism 182 as previously described.

It will be seen from the foregoing description that applicant has provided an electric toaster which is economical to manufacture; in which independent but simultaneously actuatable members are provided to set the timing control and shift the article-receiving tray or trays to toast-receiving position; in which the manually operable member for setting the clock control is itself controlled by the clock to effect an instantaneous release of the other manually operable member after the lapse of the predetermined toasting interval; in which the adjustable time setting control also may be operated to release the toast carriage and terminate the toasting operation at any time during a toasting operation; in which the clock control and release mechanism is mounted in an end chamber formed by the walls defining the external casing in the toasting chamber; in which the toaster casing is formed entirely of sheet metal stampings which are readily assembled and interlocked at a minimum manufacturing expense; in which means is provided for creating a sufficient updraft of air through the toasting chamber or chambers to insure uniform toasting of successive articles; and in which readily releasable crumb-receiving means is provided extending over the entire bottom area of the toasting chamber or chambers.

Changes may be made in the form, construction and arrangement of the parts, without departing from the spirit of the invention or sacrificing any of its attendant advantages; and the right is hereby reserved to make all such changes as fall within the scope of the following claims.

The invention is hereby claimed as follows:

1. In an electric toaster, a casing, an article-receiving tray shiftable from a non-toasting position to a toasting position relative to said casing, means for latching said tray in toasting position, operating means adapted to engage the latching means to release said latching means, time control means locking said operating means out of engagement with said latching means, and adjustable means engaging and releasing said locking means after a predetermined adjusted time interval to release said operating means for operative engagement with said latching means to move said latching means into a released position.

2. In an electric toaster, a casing, an article-receiving tray, a rectilinearly shiftable carriage carrying said tray between non-toasting and toasting positions relative to the casing, means urging said carriage and tray into non-toasting position, means for latching said carriage and tray in toasting position, latch releasing mechanism movable in one direction to engage and release said latching means, timing mechanism controlling the movement of said latch releasing mechanism in said direction, separate manually operable members constructed and arranged for simultaneous manipulation by one hand to move said carriage and tray into toasting position and setting said timing mechanism, and adjustable means releasing said latch releasing mechanism from control of said timing mechanism after a predetermined time interval for engagement of said latch releasing mechanism with said latching means whereby to move said latching means into a released position.

3. In an electric toaster, a casing, a manually operable slice-receiving carriage shiftable from a non-toasting to a toasting position relative to the casing, means for latching said carriage in toasting position, means for returning said carriage to non-toasting position upon release of said latching means, latch releasing mechanism, timing mechanism, means operated by said latch releasing mechanism upon movement in one direction for setting said timing mechanism and releasably connecting said timing and latch releasing mechanisms, said latch releasing mechanism being movable in the opposite direction under the control of said timing mechanism, a second rectilinearly shiftable carriage manually operable simultaneously with said toast carriage for moving said latch releasing mechanism in the first-mentioned direction to set said timing mechanism and releasably connect said timing and latch releasing mechanisms, and independently adjustable means for operating said releasable connecting means to disconnect said latch releasing and timing mechanism and means operatively connected to said latch releasing mechanism for snapping said latch releasing mechanism into engagement with said latching means upon release of said latch releasing mechanism from said timing mechanism whereby to move said latching means into a released position.

4. An electric toaster comprising an electrical heating means, a slice support shiftable between non-toasting and toasting positions relative to said heating means, means for maintaining said heating means normally de-energized and the slice support in non-toasting position, latching means for securing said slice support in toasting position, time controlled latch releasing mechanism for operating said latch means to release the slice support, independent manually operable members simultaneously actuable and means actuated by and requiring a full stroke of both said manually operable members for all time settings for moving the slice support into toasting position and for effecting engagement of the latching means and for energizing said heating means and setting said time controlled latch releasing mechanism.

5. In an electric toaster, a casing, an article-receiving tray shiftable from a non-toasting position to a toasting position relative to said casing, means for latching said tray in toasting position, timing mechanism, latch operating means adapted upon movement in one direction to set said timing mechanism and adapted to move in the opposite direction under the control of said timing mechanism, releasable means for connecting said latch operating means to said timing mechanism for movement in said opposite direction, manually operable means for moving said latch operating means in said one direction, and presettable means for actuating said releasable means after a predetermined adjusted time and operable to release said latch operating means from said timing mechanism at any time during a toasting operation.

6. In an electric toaster, a casing, a slice receiving carriage rectilinearly shiftable from a non-toasting to a toasting position relative to the casing, spring means for moving said carriage from toasting to non-toasting position, a pivoted latch spring-pressed into engagement with said carriage to retain the carriage in toasting position, a control carriage independent of said slice receiving carriage, a switch for controlling the toaster, timing mechanism, a lever connected to said switch and connected to said second carriage for closing said switch upon downward movement of the second carriage, a latch keeper operated by said timing mechanism, a latch constructed to move said keeper in one direction to set said timing mechanism and movable in the opposite direction with said keeper under the control of said timing mechanism, connections from said latch to said lever for moving said latch in said one direction upon depression of said second carriage, a stationary but adjustable cam constructed to engage and release said latch from said keeper, means for adjusting said cam to preset the time of release of said latch and thereby determine the toasting interval, and independent manually operable members for said slice receiving carriage and said control carriage, said manually operable members being disposed in substantially abutting relation in a common plane when the carriages are in elevated position for simultaneous depression by the fingers of one hand.

7. In an electric toaster, a casing, a slice receiving carriage rectilinearly shiftable from a non-toasting to a toasting position relative to the casing, spring means for moving said carriage from toasting to non-toasting position, a pivoted latch spring-pressed into engagement with said carriage to retain the carriage in toasting position, a control carriage independent of said slice receiving carriage, a switch for controlling the toaster, timing mechanism, a lever connected to said switch and connected to said second carriage for closing said switch upon downward movement of the second carriage, a latch keeper operated by said timing mechanism, a latch constructed to move said keeper in one direction to set said timing mechanism and movable in the opposite direction with said keeper under the control of said timing mechanism, connections from said latch to said lever for moving said latch to said one direction upon depression of said second carriage, a stationary but adjustable cam constructed to engage and release said latch from said keeper, means for adjusting said cam to preset the time of release of said latch and thereby determine the toasting interval, and independent manually operable members for said slice receiving carriage and said control carriage, said manually operable members being disposed in substantially abutting relation in a common plane when the carriages are in elevated position for simultaneous depression by the fingers of one hand, said cam being constructed for adjustment during the operation of said timing mechanism to permit manual termination of the toasting interval.

JAMES J. GOUGH.